US005749220A

United States Patent [19]
Batchelor

[11] Patent Number: 5,749,220
[45] Date of Patent: May 12, 1998

[54] TURBOCHARGED RAM TORNADO ENGINE WITH TRANSMISSION AND HEAT RECOVERY SYSTEM

[75] Inventor: William Herbert Batchelor, Melbourne, Fla.

[73] Assignee: Devine Rendezvous, Providenciales, Turks/Caicos Islands

[21] Appl. No.: 597,945

[22] Filed: Feb. 7, 1996

Related U.S. Application Data

[63] Continuation-in-part of Ser. No. 5,262, Oct. 13, 1995.
[51] Int. Cl.⁶ ..................................................... F02C 3/00
[52] U.S. Cl. .................. 60/39.75; 60/39.16; 60/39.5; 60/39.54; 60/726
[58] Field of Search .................. 60/39.161, 39.17, 60/39.5, 39.54, 729, 39.75

[56] References Cited

U.S. PATENT DOCUMENTS

| | | | |
|---|---|---|---|
| 2,195,025 | 3/1940 | Couzinet | 60/726 |
| 3,533,493 | 10/1970 | Braun | 60/39.161 |
| 3,625,003 | 12/1971 | Liddle et al. | 60/39.161 |
| 3,808,802 | 5/1974 | Tanasawa | |
| 4,173,121 | 11/1979 | Yu | 60/39.161 |
| 4,845,944 | 7/1989 | Rodgers | |
| 5,149,117 | 9/1992 | Wilkens, Sr. et al. | |

Primary Examiner—Charles G. Freay
Attorney, Agent, or Firm—Frank A. Lukasik

[57] ABSTRACT

A turbocharged ram tornado engine coupled with a jet tornado turbine heat recovery system, a variable speed fluid transmission, and a muffler/water recovery assembly. A combustor provides a source of hot gases which are forced into a tornado form inside an annular chamber housing a first turbine wheel, water is injected in the gas stream, the swirling gases are then passed to a second turbine wheel, via a turbocharger connected to the first turbine exhaust which provides air to the combustor, and a muffler/water recovery system for condensing and recovering water injected into the engine.

4 Claims, 7 Drawing Sheets

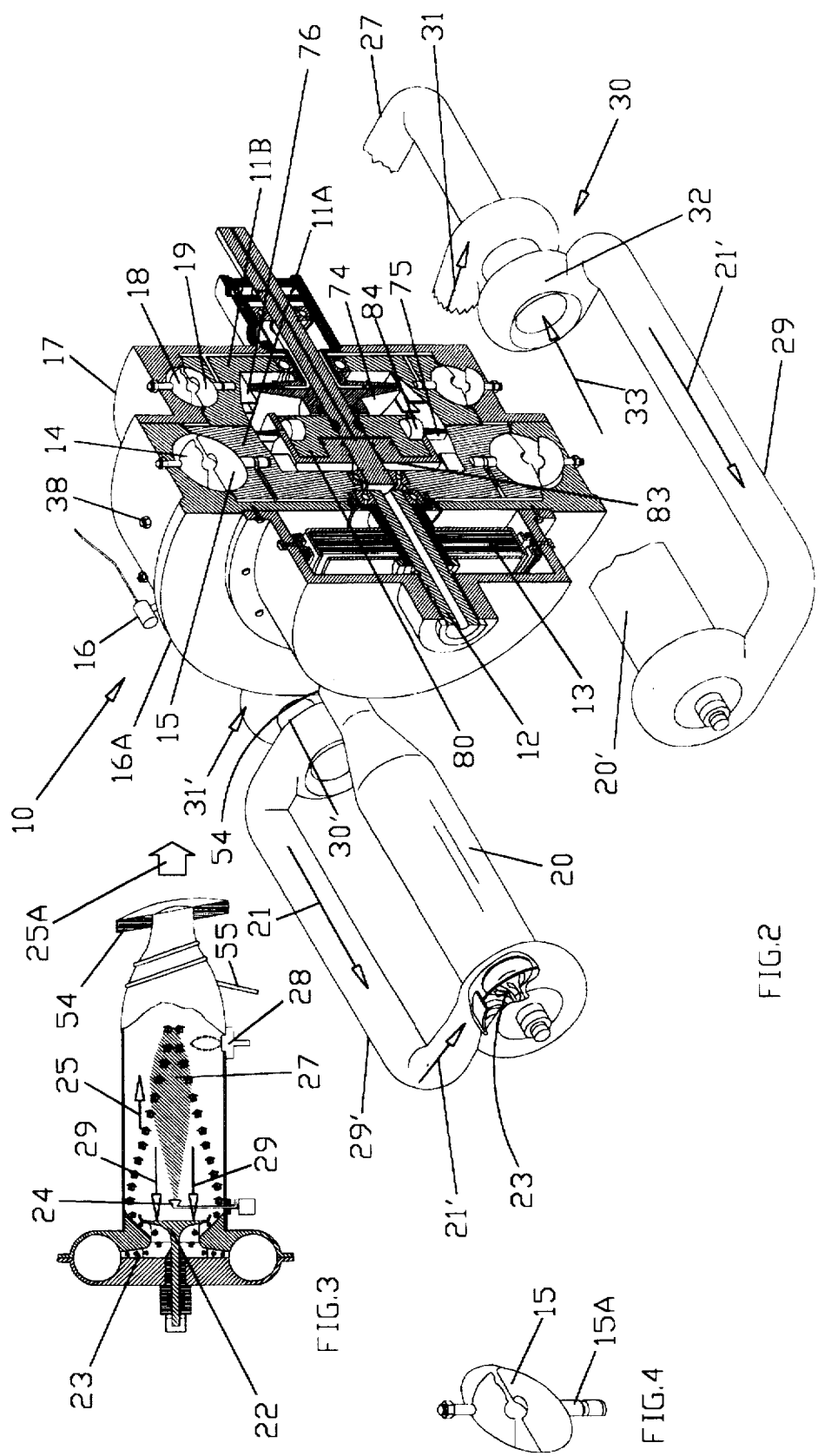

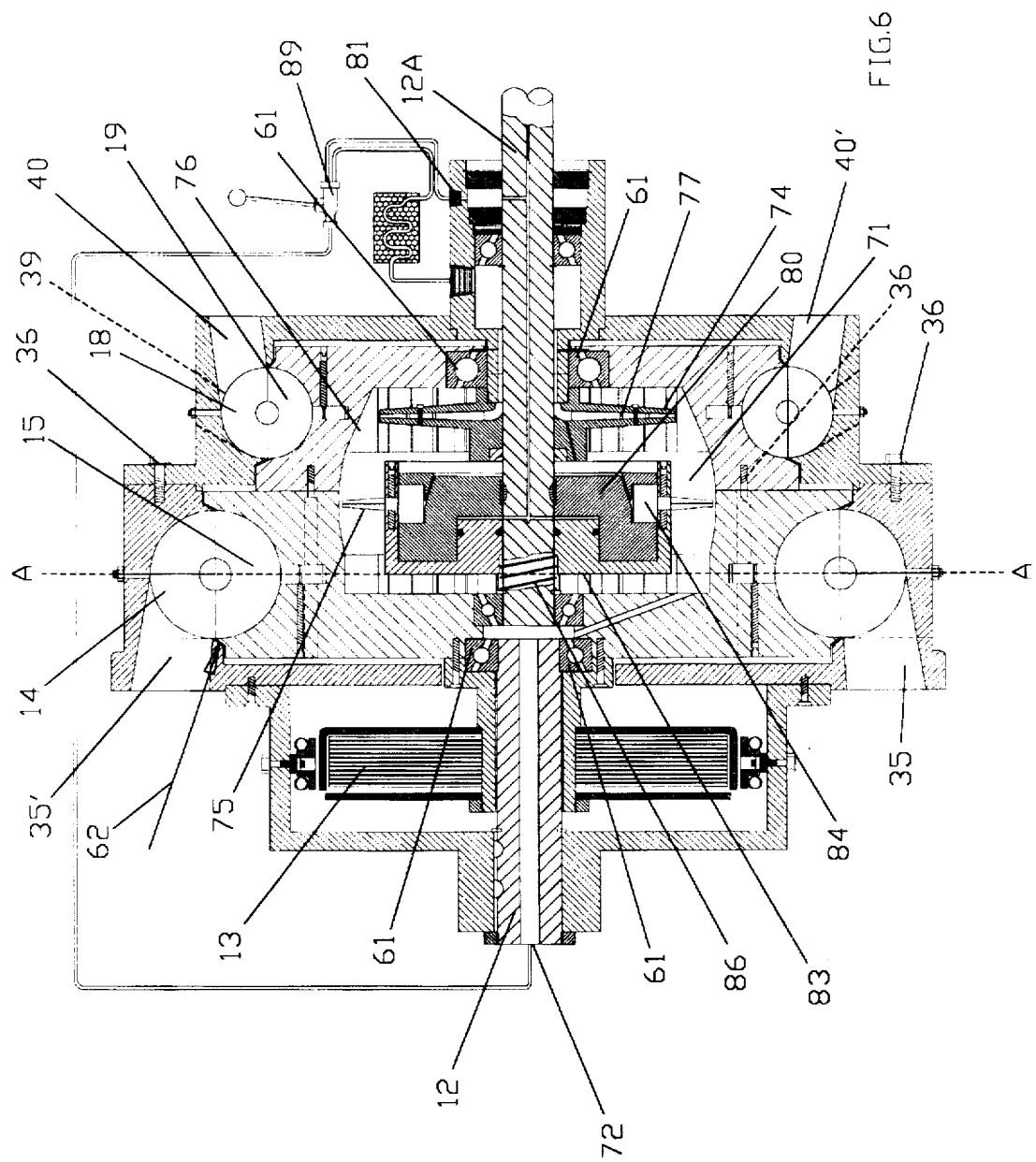

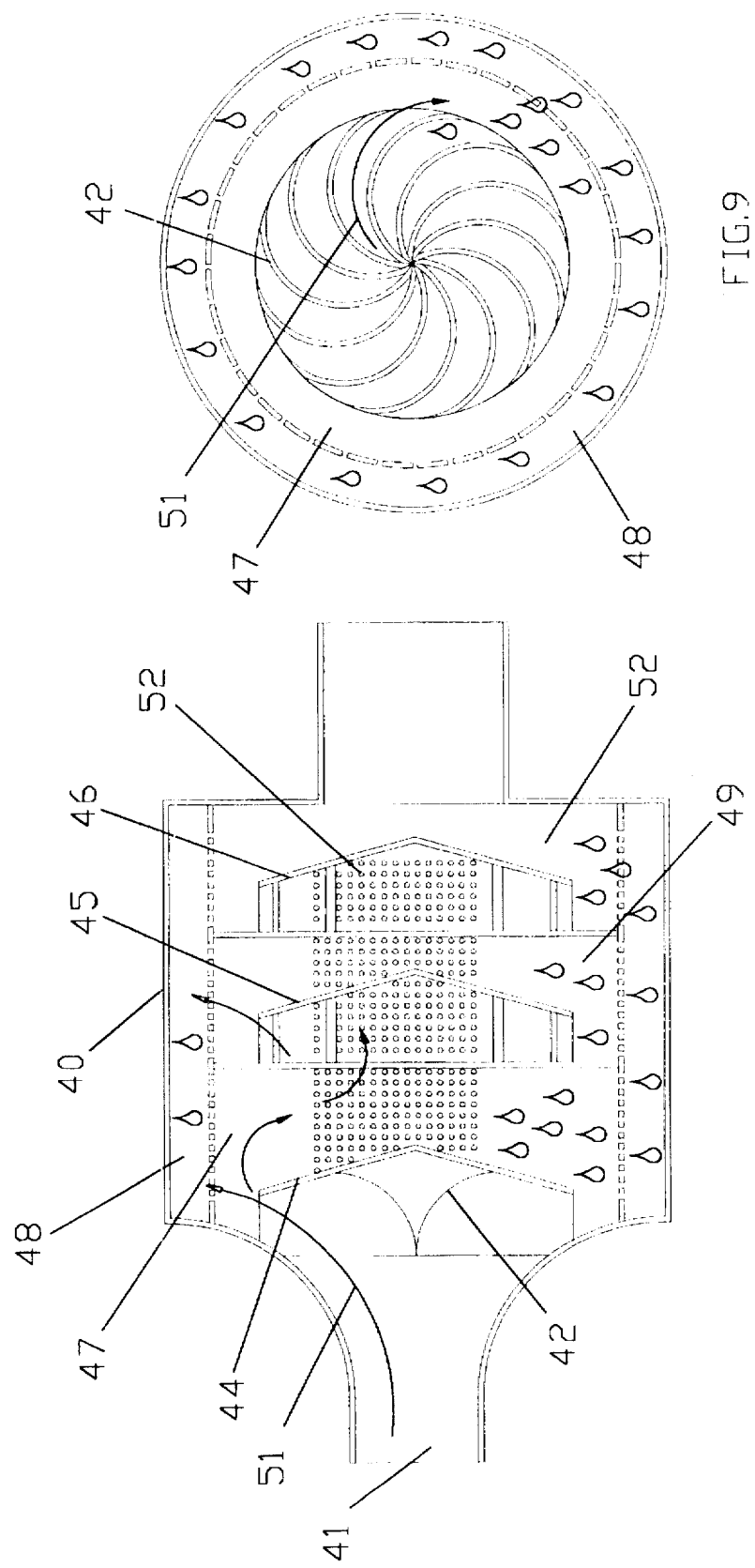

TURBOCHARGED RAM TORNADO ENGINE WITH TRANSMISSION AND HEAT RECOVERY SYSTEM

RELATED APPLICATION

This application is a Continuation-In-Part of Ser. No. 60/005,262, Filed Oct. 13, 1995.

BACKGROUND OF THE INVENTION

1. Field of the Invention

This invention relates to turbine power plants and transmissions and more particularly to a turbocharged ram tornado engine adapted to operate on any fuel.

2. Description of the Prior Art

There is a worldwide need for reliable, non-polluting engines and transmissions. There are currently moratoriums on government regulations concerning the production of Experimental and Ultra-Light Aircraft and a timetable for the termination of production and sales of two-cycle inboard/outboard and on/off-road vehicles due to pollution factors involved with two stroke engines in the United States. Several other Governments are in dire need for pollution reduction. They have spent millions of dollars in futile attempts to promote and produce the products necessary to bring their air quality in line with a sustainable growth in society. Many nations are prepared to subsidize, promote and produce anything that will help modernization and industrialization of their countries and economies while stressing the stress on the environment which will necessarily follow.

One prior art attempt to provide a dual mode gas turbine power plant is described in U.S. Pat. No. 4,845,944 to Rodgers discloses a main power unit with a low pressure turbine engine and a high pressure turbine engine. In normal, full load operation the two engines are connected so that combustion supporting gas is first compressed in the low pressure turbine engine and subsequently further compressed in the high pressure turbine engine before being directed to a combustor to burn fuel which is initially expanded in the high pressure turbine engine and further expanded in the low pressure turbine engine. Fuel economy at partial load is obtained along with the generation of some power via the high pressure unit by providing valves which may be operated to bypass the low pressure engine thereby reducing the air and corresponding consumption of fuel to that required to drive only the accessory unit.

SUMMARY OF THE INVENTION

The turbocharged ram tornado engine coupled with the jet tornado turbine heat recovery system and the variable speed fluid transmission offers an extremely smooth power plant. The three flywheels in the system, one in the engine, one in the heat recovery system and one in the transmission will all store kinetic energy to give fast starts, yet maintain economy. The instant invention offers low maintenance with superb economy. The system may have an indicated thermal efficiency of 80% at all ranges of speed and power while a conventional system may reach 34% at one speed and power setting. This will mean greater fuel economy than ever before. The instant invention may be adapted to all types of applications world wide. This makes the system ideal for airplanes, helicopters, cars, boats or portable engines.

The engine of the invention has only one moving part with a simple, clean design. The rotary design of this engine will have no loss of kinetic energy and a minimum friction factor. Another advantage is that there is no chance for oil to contaminate the clean burn of the engine or no piston rings to wear that will effect the engine performance. Any engine operating at the RPM at which maximum bhp is developed, will have its maximum mechanical efficiency and thermal efficiency. Maximum mechanical efficiency for the instant invention will reach 97% compared to a piston type engine of 90%. Maximum thermal efficiency for the instant invention will be 41% compared to a piston type engine 34%. My engine will deliver years of trouble free service with unbeatable economy. This engine, with only three moving parts will be simple to manufacture and maintain, it is at last a long overdue replacement for all piston type engines. The engine of the invention can be built in any size, large enough to generate electricity in a public power plant or small enough to power a model airplane.

The jet tornado turbine heat recovery system (could also be referred to as the turbine second stage) has only one moving part. This system will recover the heat energy of the fuel that is normally lost through the radiator and exhaust and with this engine system will turn it into usable energy. A conventional type gasoline or diesel engine has a maximum thermal efficiency of 34%. The remainder of the heat is lost through the exhaust gases 40% to 45%, the cooling system 15% to 20%, and the kinetic energy plus friction within the engine averages 10% minimum. The heat recovery system of the invention will recover up to 60% of the 55 to 65% of the heat lost through the exhaust and cooling system. It is estimated that the turbocharger and electronic fuel injection system will bring this engine's indicated thermal efficiency to approach 41%. The engine of the invention coupled with this heat recovery system could have an indicated thermal efficiency of 80%.

The variable speed fluid transmission is a replacement for conventional transmissions. This transmission's mechanical efficiency will approach 97%. The transmission will deliver an unlimited ratio of reduction reverse or forward with absolute maximum of efficiency. The transmission will allow the engine to operate at all times at its maximum efficient RPM while the transmission supplies the torque needs at whatever RPM or speed that is required. This would mean that city driving or country driving would have similar mileage.

The variable speed fluid transmission will offer an extremely smooth power plant. The three flywheels in the system, one in the engine, one in the heat recovery system and one in the transmission will all store kinetic energy to give fast starts yet maintain economy. This system provides low maintenance with superb economy. The system may have an indicated efficiency of 80% at all ranges of speed and power while a conventional system may reach 34% at one speed and power setting. This will mean greater fuel economy than ever before. The system may be adapted to all types of applications world wide. The system of the invention is an ideal system for airplanes, helicopters, cars, boats or portable engines.

BRIEF DESCRIPTION OF THE DRAWINGS

FIG. 2 is a top perspective view of the invention, partially in section.

FIG. 3 is a side sectional view of a ram jet in accordance with the invention.

FIG. 4 is a perspective view of a fin and an airfoil section showing their relationship in the assembly.

FIG. 6 is a top sectional view of a turbocharged ram tornado engine in accordance with the invention.

FIG. 8 is a side sectional view of a muffler/water recovery assembly in accordance with the invention.

FIG. 9 is a front sectional view of a muffler/water recovery assembly in accordance with the invention.

DESCRIPTION OF THE PREFERRED EMBODIMENT

Figure 1:
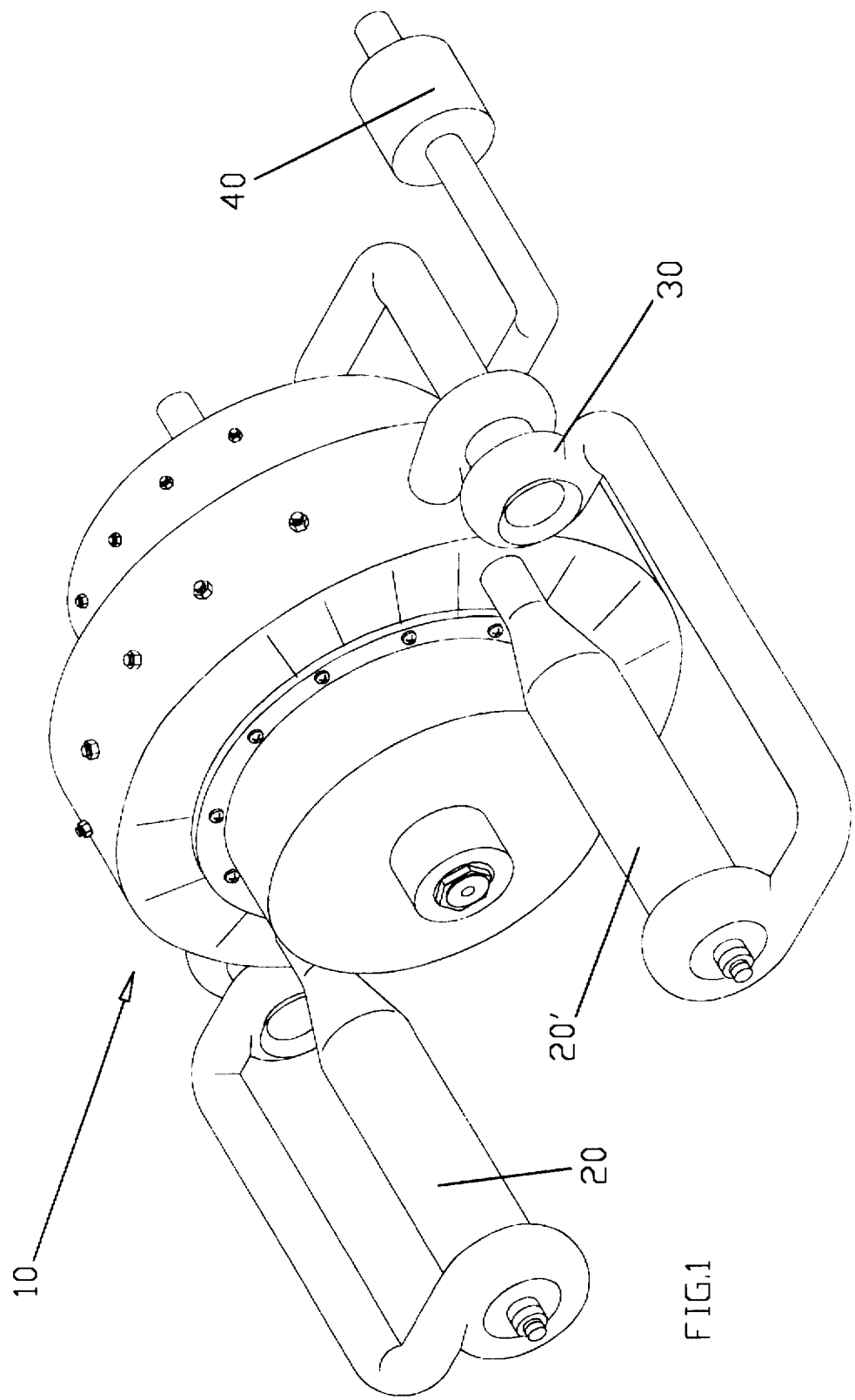
FIG. 1 is a top perspective view of the turbocharged ram tornado engine with transmission and heat recovery system in accordance with the invention.

FIG. 1 shows the exterior view of the turbocharged ram tornado engine with transmission and heat recovery system illustrated in general with the numeral 10. The major components of the system 10 are the ram jets 20 and 20', turbocharger 30, muffler water recovery system 40 and reversible transmission 50.

Figure 5:
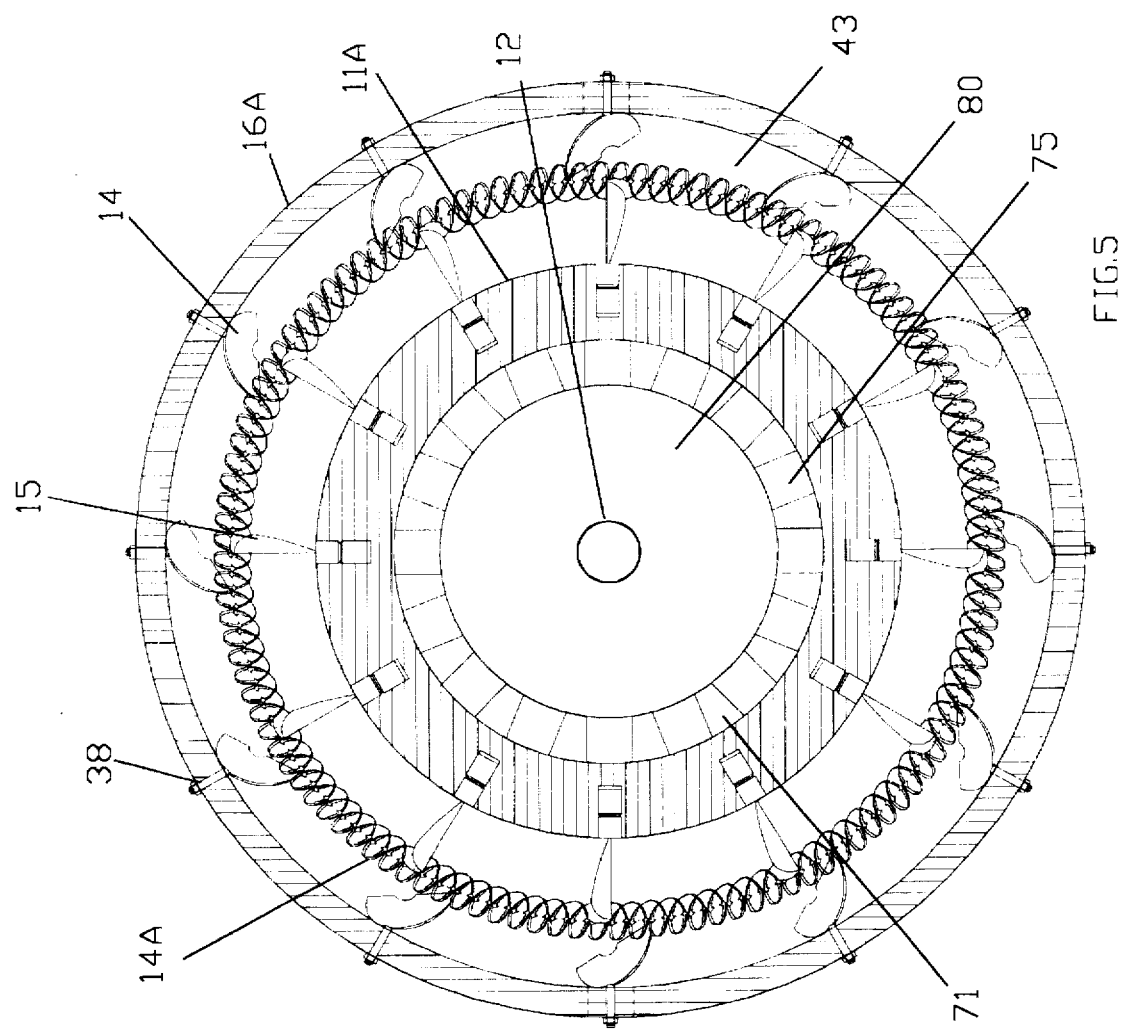
FIG. 5 is a front sectional view of the turbine showing the tornado swirl over the fins and airfoil sections.

Referring to FIG. 2, there is shown a top perspective view of the tornado engine 10, partially in section, which consists of a shaft 12, starter/generator 13, turbine wheel 11A, blades 15 and 19 mounted on turbine wheels 11A and 11B, and blades 14 and 18 which are adjustably mounted in cases 16A and 17. Adjusting screws 37 and 38 are used to set the fins 14 and 18. Also mounted on case 16A, is a water injection port 16. FIG. 5 is a vertical cross section through section line A—A (in FIG. 6), which shows the relationship between the shaft 12, the turbine wheel 11A, transmission hub 80, case 16A, fixed blades 14, chamber 71, variable pitch transmission blades 75, tornado swirl 14A, and annular chamber 43.

FIG. 3 is a sectional view of combustor 20, partially in section, showing combuster 20 which consists of poppet valve 22, blade 23, fuel jet injector 24, fuel heating tube 55, combustion chamber 27, and glow plug or sparkplug 28. Combuster 20 is affixed to case 16A as shown at joint 54.

Second case 17 is affixed to case 16A, with vibration resistant screws 36, in line with shaft 12. Wheel 11B, having fins 19 mounted thereon, rotates around shaft 12 on bearings 61. Fins 18 are adjustably mounted in case 17. Turbochargers 30 and 31' increases air pressure 21 and 21', through to inlet of combusters 20 and 21' are driven by exhaust steam from wheel 11A through conduits 31 and 31'. Said exhaust gases from wheel 11A leave turbocharger 30 through conduit 27 (affixed to case 17) where they act upon blades 19 affixed to rear wheel 11B.

FIG. 6 is a top sectional view of a first embodiment of the engine 10 showing a transmission for possible aircraft use where no reverse is required and also showing fixed shaft 12, rotating-output shaft 12A, starter/generator 13, turbine wheel 11A blades 15 mounted on turbine wheel 11A and blades 14, mounted on case 16A, blades 19 mounted on turbine wheel 11B and blades 18 mounted on case 17. Adjusting screws 37 are used to set the fins 14 and 18. Also shown, is proximity seal 62, main bearings 61, impact stator wheel pump 74, oil fins 71, variable-pitch driving blades 75 affixed to rotating bases 84, slidably mounted blade-actuator cam 87, transmission hub 80, vibration resistant screws 36, transmission oil control valve 89, transmission oil inlet 81, return oil outlet 72 and blade-actuator cam return spring 86. Turbine wheels 11A and 11B are joined together by vibration resistant screws 36. Oilway 66 carries pressurized oil to move blade actuator-cam 87. Openings 35, 35', 40, 40' admit expanding gases from combustor (35, 35') and steam (40, 40').

Wheels 11A and 11B, mounted on shaft 12 at one end and shaft 12A on the other end, contain a chamber 71 filled with a fluid entering through port 72. Fixed fins 76 are mounted on the inside of wheels 11A and 11B. Stator fins 77 are affixed to fixed impact stator wheel pump 74. Fins 75 are rotatably mounted in wheel 80 and are connected to cams 84. Wheel 80 is slidably mounted on shaft 12A and is moved horizontally by applying oil pressure through port 81. When oil pressure is applied to port 81 cam actuator wheel 83 slides along shaft 12A causing variable-pitch driving blades 75 to rotate and present a flat surface to the fluid within chamber 71 and causing wheel 80 and thus shaft 12A to spin.

Figure 6A:
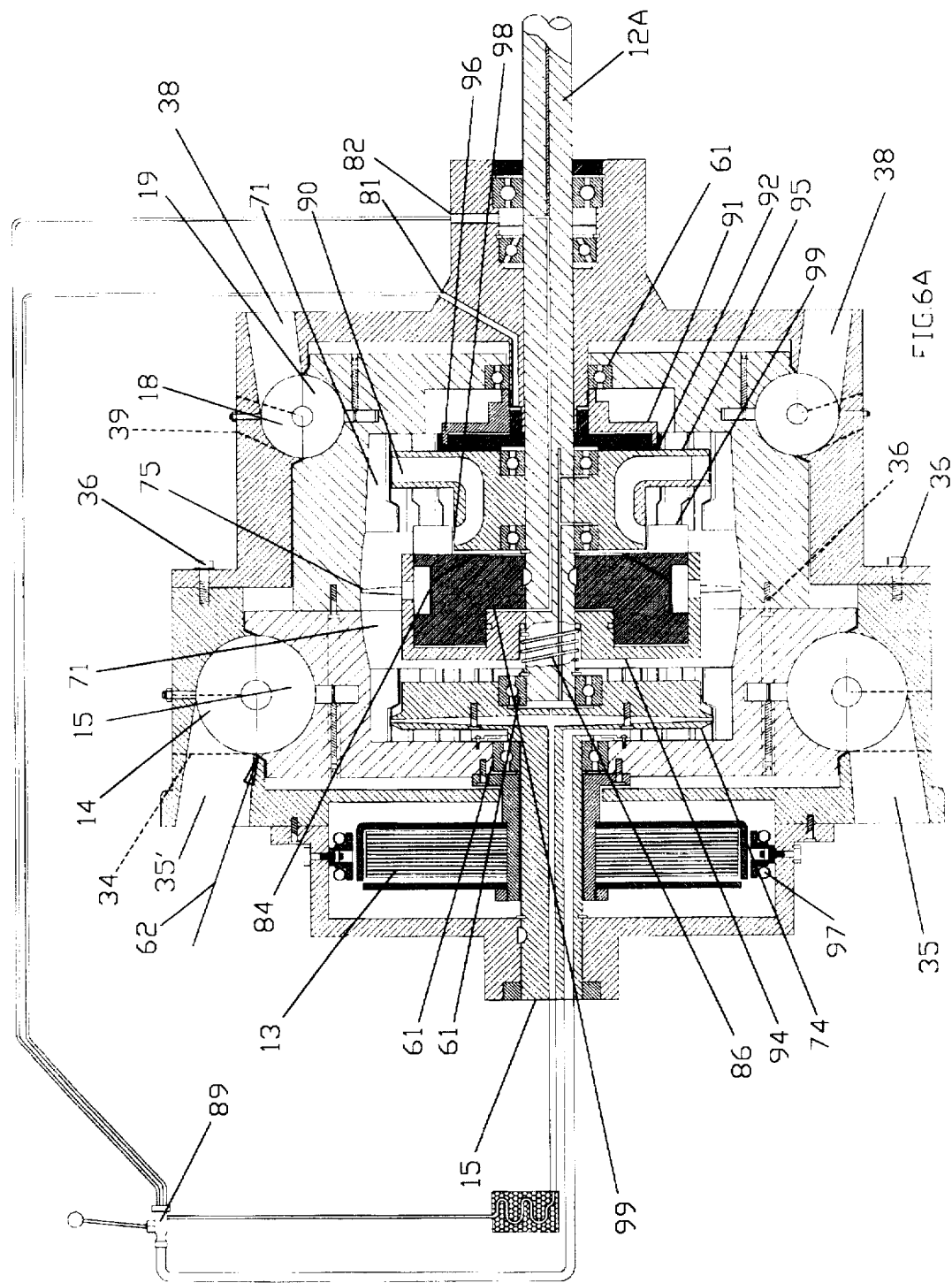
FIG. 6A is a top sectional view of a second embodiment of the transmission of the invention.

FIG. 6A shows a second embodiment of the engine with a modification to the transmission 50 allowing the transmission 50 to be reversible.

In FIG. 6A, when oil pressure is applied to port 81, the clutch pressure plate 92 is forced into contact with the free wheeling impact pump housing 95. The clutch pressure plate 92 is held from spinning by pins 96. When this contact is made, the free wheeling impact pump housing 95 is held stationary. Then the spinning oil impacts on the now fixed blades 90, causing oil to be pumped out of ports 98 onto blades 93 mounted on wheel 99 and pitched to cause a reverse thrust. Return springs 85 and 86 return the wheel 80 to a center position. Stops 87 and 88 are used to set the range of travel of wheel 80.

Figure 7:
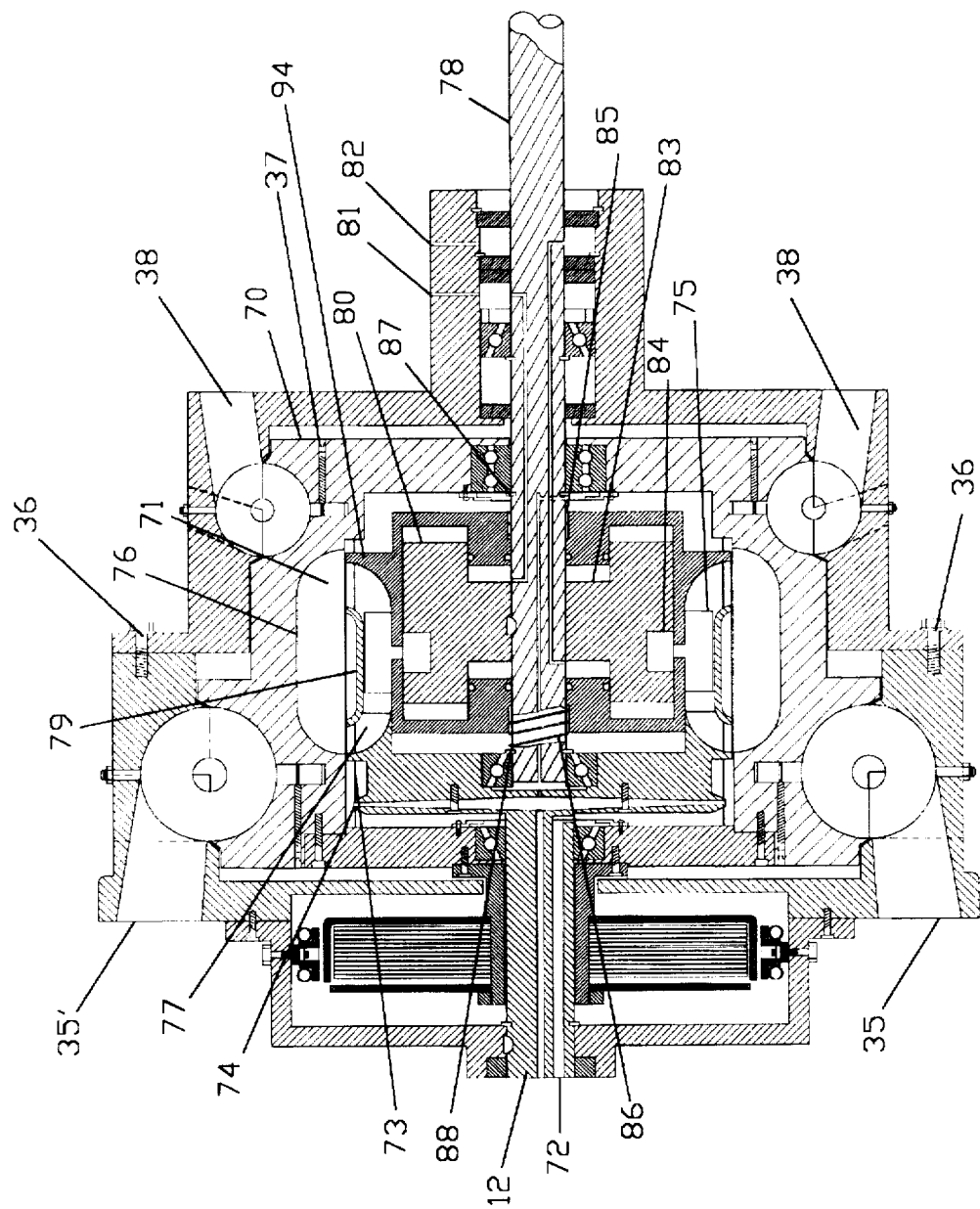
FIG. 7 is a top sectional view of a third embodiment of the transmission of the invention.

FIG. 7 is a top sectional view of a third embodiment of the engine 10 with a reversible transmission 50 fitted internally. Common parts in FIGS. 6, 6A, and 7, which function in the same manner, are indicated by the same numerals. Wheel 70, mounted on shaft 78 at one end and shaft 12 on the other end, contains a chamber 71. Deflector shields and fixed fins 76 are mounted on the inside of wheel 70. Stator fins 77 are affixed to fixed impact stator wheel pump 74 causing fluid 73 to circulate under pressure beneath guide 79 which is mounted to fixed stator wheel pump 74. Fins 75 are rotatably mounted in wheel 80 and are connected to cams 84. Wheel 80 is mounted on shaft 78. Cam-actuator 94 is slidably mounted on shaft 78 and is moved horizontally by applying oil pressure through ports 81 and 82.

Variable pitch blades are rotatably mounted on cams 84. As oil is applied under pressure through either port 81 or port 82, cam actuator 94 slides in the required direction to turn variable pitch blades 75 in such a way as to present a flatter surface towards circulating oil 73 causing wheel 80 and shaft 78 to spin according to the angle said variable pitch blades are set.

FIGS. 8 and 9 depict the details of construction and operation of the water/exhaust collector 30. Collector 30 is preferably made of stainless steel and comprises an inlet port 41, blades 42, an inner chamber 47, an outer chamber 48, and small holes 53 through walls 44, 45, and 46.

The engine 10 is started by spinning shaft 12 with the starter/generator 13, and in turn the turbine wheel 11A. This causes air to be drawn into combustor 20 along the direction of arrow 21 through poppet valves 22. The poppet valves 22 face a blade 23 attached under the head of the valve 22 which causes the air to swirl to achieve a better fuel/air mixture. Fuel is injected through fuel jet 24 in the direction of arrow 25 into combustion chamber 27. The fuel/air mixture in chamber 27 is ignited by the glowplug or sparkplug 28. The force of the explosion forces hot gases in the direction of arrows 29 thus closing poppet valve 22. This prevents hot gases from exhausting out the intake of the combustor 20, instead, the hot gases are forced out in the direction of arrow 25A. These gases are directed into a tornado swirl 14A over fins 14 mounted in case 16A then onto the fins 15 mounted on wheel 11A. The RPMs of shaft 12 are regulated by the difference in the angles between fins 14 and 15, the frequency of explosions within the combustor 20, the amount of fuel injected at injector 24 and the airfoil section 15A on the back side of fin 15. Mounted in the case 16A, about 30° after the combustor 20 inlet port (joint 54), is a water injection, port 16. The effect of the injection of water at this point of the combustion/rotation cycle is twofold; to create steam and to act as a cooling agent. By creating steam, more energy is utilized from the combustion of the fuel. The heat caused by the combustion instead of being lost through radiation is recaptured by the water which in turn heats up, expanding as it becomes steam. The expansion of the water into steam adds more weight deflection to the fins 15 and as the wheel 11A turns about 170° (depending on the number of combustors 20 and turbochargers 30 and 30' in use), it is exhausted in the direction of arrow 31 into turbocharger 30.

Under existing well known principles of turbochargers, the hot exhaust gases leaving the chamber in wheel 11A cause turbochargers 30 and 31' to spin causing fresh air to enter in the direction of arrow 33. It is then compressed in chamber 34 and directed into the combustor 20 in the direction of arrows 21 and 21A. The exhaust from the turbocharger 30 is directed into a second case 17 and onto wheel 11B over fins 18 and 19. More work is there extracted from the original fuel combustion/steam generation. This dramatically increases the thermal efficiency of the engine. The engine 10 is low friction and uses the waste heat produced by the engine to help produce output power.

Referring to FIG. 5, there is shown the tornado concept arrangement of blades 14 and 15 in case 16A and wheel 11A form an air/gas/steam screw to convert the flow of gases exiting from said first combustor jet and steam exiting from said first turbocharger into a tornado formation thus increasing the speed of said gases to sufficient velocity to create lift on said fins and accelerate rotary movement of said turbine wheel(s), and maximize torque on the shaft 12.

Referring to FIG. 6, the obvious advantages of the invention are shown, including an entirely rotary motion with no lost motion and no sliding metal to produce friction. The wheel 11A is aligned and held by the bearings 61 on shaft 12A. By feeding power impulses to both sides of wheel 11 and 11B bearings 61 receive equal load and neither one has to absorb all of the shock from combustion impulses. As a gas seal, wheel 11A runs very close to case 16A in the area of arrow 62 but there is no contact between 11A and 12. This lessens the danger of oil entering the combustion chamber or the exhaust. This, along with an electronically controlled fuel mixture, means pollution levels are very low.

FIGS. 6 and 7 illustrate two versions of the turbocharged ram tornado engine with a transmission fitted internally. The transmission 50 is mounted internally and filled with fluid for liquid balancing and cooling for the turbine wheels. The transmission 50 has an effective operating speed from 8000 RPM to 12000 RPM. Optimum speed is over 8000 RPM and below 12000 RPM. If the engine is run in excess of 12000 RPM, heat is created. If it is run below 8000 RPM, efficiency is diminished.

The internal transmission allows the engine 10 to operate at optimum speeds at all times and provides an infinite ratio of speeds both forward and reverse. Inside of wheel 70 there is a chamber 71 filled with fluid entering through port 81 and maintained at level 73 by the fixed impact stator wheel pump 74. This stator wheel pump 74 circulates oil to the bearings 61 and creates sufficient oil pressure to control the power output fins 75. The fixed fins 76 ensure the fluid in chamber 71 stays at the same RPM as wheel 70. The spinning fluid is picked up by stator fins 77 which direct the fluid down towards shaft 78 then turns the fluid parallel to shaft 78, under deflection shield 79 and over fins 75 mounted in wheel 80 which is fixed to shaft 78. Shaft 78 is connected directly to the drive wheels or other load. When fins 75 are turned by a suitable method (such as described below) so they begin to present a flat surface for the fluid in chamber 71 to push against, wheel 80 is forced to spin, which drives output shaft 78 at a speed relative to the settings of the fins. An infinite ratio of speeds both forward and reverse is possible between wheels 70 and 80.

Fins 75 are rotated when oil pressure is applied through ports 81 or 82 which forces piston 83 to move, causing cam 84 and fin 75 to turn. Cam 84 and fin 75 are one piece. Return springs 85 and 86 assure that fin 75 returns to its neutral state when oil pressure is released. The stops 87 and 88 set the upper speed range by their position.

FIGS. 8 and 9 depict the muffler/water recovery assembly 40 which is normally attached to the exhaust port of the engine 10. The exhaust 51 from the engine is made of burnt gases, water vapors, steam and air. The gas 51 enters into inlet port 41. Blades 42 direct the exhaust towards the outer surface of the inner chamber 47 in a circular motion. This motion causes a centrifugal force which causes the heavier particles and water droplets to be forced through the small holes 53 of the inner chamber 47 to condense on the inner surface of outer chamber 48 where it can be recovered as a liquid. The lighter and cleaner air enters port 49 where the same separating and cleaning action occurs, this cycle is repeated a third time in third stage 52. Small holes 53 through walls 44, 45, and 46 equalize the pressure in each chamber, thus canceling the resonance and noise from the exhaust port.

From the foregoing, it will be appreciated that a turbocharged ram tornado engine made according to the invention offers an extremely smooth power plant, low maintenance and superb economy. The flywheels in the system will all store kinetic energy to give fast starts, yet maintain economy.

What is claimed is:

1. A turbocharged, ram tornado engine comprising:
   a first and second combustor jet,
   a first and second engine case having two annular chambers, and an assembly of a first and second turbine wheel mounted on a first and second shaft for rotation, and fins mounted on said first and second turbine wheels and within said annular chambers to form an air/gas/steam screw to convert the flow of gases exiting from said first combustor jet into a tornado formation thus increasing the speed of said gases to sufficient velocity to create lift on said fins and accelerated rotary movement of said turbine wheels,
   water injection means connected to said engine case for injecting water into said tornado swirl for creating steam and cooling said gases,
   transmission means mounted on said second shaft within a chamber inside said engine for transmitting power to an external load, through the medium of a fluid serving also as a liquid balancing and cooling agent for said turbine wheels,
   turbocharger means connected between said first and said second engine cases for removing exhaust from said first chamber and connected to said first combustor jet for providing fresh air to said first combustor jet, and a muffler/water recovery means attached to said second engine case for removing exhaust, and condensing and recovering water injected into said engine.

2. The turbocharged, ran tornado engine of claim 1 wherein said first and second turbine wheels have an interior chamber formed therein and a wheel slidably mounted on said second shaft, said interior chamber having deflector shields and fins mounted on the inside periphery of said chamber, and being filled with a fluid, and said wheel having rotatable fins adjustable to control forward speed by applying fluid pressure, and reset by return spring pressure, whereby rotation of said first and second turbine wheels drives said fluid at the same RPM as said turbine wheels and thereby drives said slidable wheel at a desired speed.

3. The turbocharged, ram tornado engine of claim 2 wherein said slidable wheel is moved and reset by applying fluid pressure to control reverse speed.

4. The turbocharged, ram tornado engine of claim 1 wherein said muffler/water recovery means comprises an inlet port, a plurality of blades to direct exhaust in a circular motion towards the exterior, an inner chamber with a plurality of walls having a plurality of holes therethrough, said plurality of walls forming a second and third separating and cleaning action and canceling the resonance and noise from said exhaust while providing a backpressure within said engine to facilitate the formation of said tornado of steam to create lift on said turbine fins.

\* \* \* \* \*